Aug. 6, 1940.  G. E. BULLOCK  2,210,277

METHOD OF MAKING PRESSURE TANKS

Filed April 20, 1936

INVENTOR
GILES E. BULLOCK
BY
ATTORNEY

Patented Aug. 6, 1940

2,210,277

UNITED STATES PATENT OFFICE 2,210,277

METHOD OF MAKING PRESSURE TANKS

Giles E. Bullock, Rochester, N. Y.

Application April 20, 1936, Serial No. 75,331

1 Claim. (Cl. 29—148.2)

This invention relates to the manufacture of pressure tanks made up of comparatively thin sheet steel and has for one of its objects to provide a method of making such a tank whereby the inside and outside of the tank may be galvanized after the completion of the tank.

Another object of this invention is to provide a new method of manufacture for thin sheet steel tanks during which the joints in the tank are sealed by the galvanizing process to which the tanks are subjected in the manufacture thereof.

A further object of this invention is to provide a novel method of electrically welding a pressure resisting head into the tank and completing the forming of the head after it is fastened to the tank.

Another object of this invention is to provide a novel method of fastening an open head to the tank and forming a non-corrosive closure seat between the head and the tank during the manufacture thereof.

All these and other objects and attendant advantages will become more readily apparent from the detailed description of the invention which follows, reference being had to the accompanying drawing in which.

In the several figures of the drawing like reference numerals indicate like parts.

The novel method of manufacturing thin sheet steel tanks forming the subject matter of my present invention is illustrated in connection with the manufacture of sprayer tanks which have heretofore been made up of ganvanized sheet steel stock or non-corrosive sheet metal. In the use of galvanized sheet steel any joints between the various sections and heads of the tank had to be carefully soldered to withstand the pressure in the tank and make the joints non-corrosive. In addition the cut ends of any portion of the galvanized sheet metal which remained exposed after the tank was otherwise completed had to be covered with solder or other non-corrosive coating to make the tank suitable for use in a sprayer tank to prevent rapid corrosion of the exposed or uncoated metal by the spraying material.

In my present invention I have invented a method of making a thin sheet metal tank from uncoated thin sheet metal stock using an electric welding process between the sections and heads of the tank and then sealing and coating the electrically welded joints during the process of galvanizing the tank both inside and out after the tank is otherwise completed.

Figure 1:
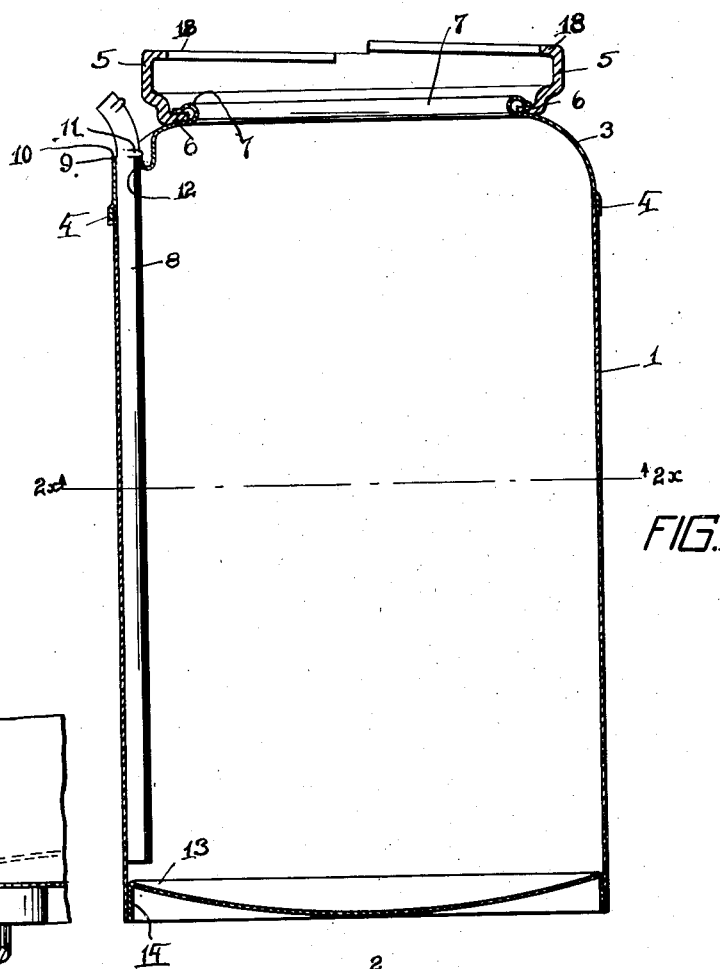
Figure 1 is a vertical sectional view of the thin sheet steel tank made up in accordance with my invention.

As illustrated in Figure 1 of the drawing, the tank, made according to my novel method, comprises a cylindrical body 1 which is electrically lap welded with a longitudinal seam 2 the full length thereof.

To the top of this cylindrical body is electrically lap welded an open ended thin sheet steel head 3 which for this purpose has one end telescopically engaged over the end of the cylindrical body as indicated at 4 in Figure 1.

To the open end of the head 3 is fastened another sheet steel head 5 and to anchor this second head 5 to the first head 3, the open end of the first head is spun or folded over the inwardly projecting flange 6 in the bottom of the second head. In this way the second head is firmly clinched to the first head and a closure seat 7 is provided surrounding the open end of the tank to which the closure member (not shown) is adapted to be clamped in sealing the open end of the tank.

Sprayer tanks of the type illustrated in the drawing are provided with a delivery tube 8 from which the spraying material is forced for spraying purposes. This delivery tube is located against the inside of the wall of the tank and extends from within a short distance from the bottom on the inside of the tank thru a hole in the head 3 to the outside thereof. For this purpose a tubular member 9 is forced outwardly of the head so as to provide a shoulder 10 on the outside thereof to have the shoulder 11 formed on the tube rest thereon and hold the tube in a predetermined position in the head. Forcing the tubular member from the inside of the head provides a sealing channel 12 between the tubular member and the delivery tube suspended therein, which will fill itself automatically with the galvanizing metal during the galvanizing of the entire tank.

The delivery tube, in being held suspended from the head 3 as above pointed out, is also held in close proximity to the inside wall of the body 1 of the tank so that the galvanizing metal in covering the outside of the tube and the inside wall of the tank will fasten the tube automatically to the tank the full length of the tube within the tank.

Figure 3:
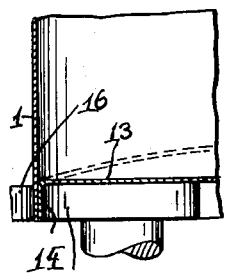
Figure 3 is a detail sectional view of a portion of the bottom of the tank illustrating the manner of welding the bottom head to the tank.
Figure 2:
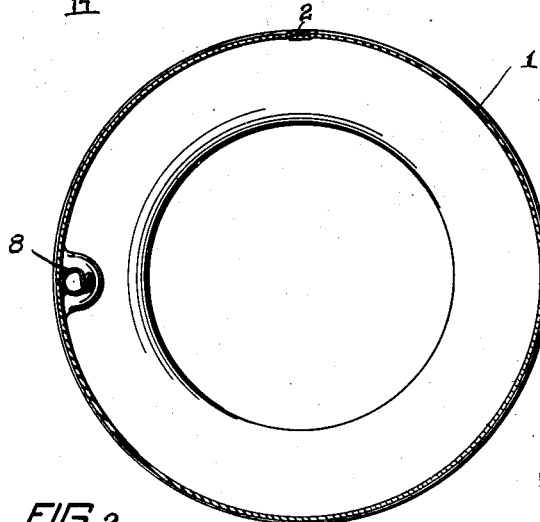
Figure 2 is a horizontal sectional view thereof taken on the line 2x—2x of Figure 1.

To permit the use of the electric welding process between the head 13 and the bottom end of the body 1 of the tank from the outside of the tank, the head is but partially formed with the bottom left flat or concave as illustrated in Figure 3 so that the cylindrical flange 14 thereof can telescope into the tank body with sufficient space on the inside of the flange to have a comparatively large disc shaped electrode 15 rotate in contact with the flange with a similar electrode 16 cooperating therewith on the outside of the tank opposite thereto.

After the flange of the head is thus electrically welded into the body of the tank, the head is completed by convexing it outwardly as illustrated in Figure 1.

With the thin sheet steel tank mechanically completed in this manner it is finished by its submersion in a galvanizing bath in such a manner that the galvanizing metal is allowed to flow into the large opening in the head so as to contact and cover the inside and outside of the tank and seal the joints between the various sections of the tank, the lap seam in the delivery tube, the joint surrounding the delivery tube and at the same time fasten the delivery tube to the inside of the tank the full length thereof.

Fastening the head into the tank by electric welding, as above described and as shown in the drawing, provides the weld close to the edge of the head so that when pressure is created in the tank, the edge of the head cannot pull away from the wall of the tank and expose the sheet steel around the edge of the head to the corrosive effect of the spray material.

The supplementary head 5 which is mechanically fastened to the head 3, as above described, is provided with inturned and angularly disposed locking flanges 18, 18 and when this tank and head are galvanized these locking flanges are simultaneously coated with it.

I claim:

The method of making a metallic receptacle which consists in forming from sheet metal a cylinder with one end closed and the other end dome shaped with an opening in the dome shaped end, providing a collar having an inwardly directed flange, attaching the collar to the dome shaped end by setting the inwardly directed flange of the collar on the dome shaped end and bending the marginal portion of the dome shaped end outwardlly horizontally to grip the collar flange, thus providing a seat integral with said dome, and then immersing the entire receptacle in a galvanizing bath.

GILES E. BULLOCK.